Feb. 8, 1955  D. D. DEMAREST ET AL  2,701,385
SAUSAGE SEVERING AND SKINNING MECHANISM
Filed Dec. 27, 1952  7 Sheets-Sheet 1
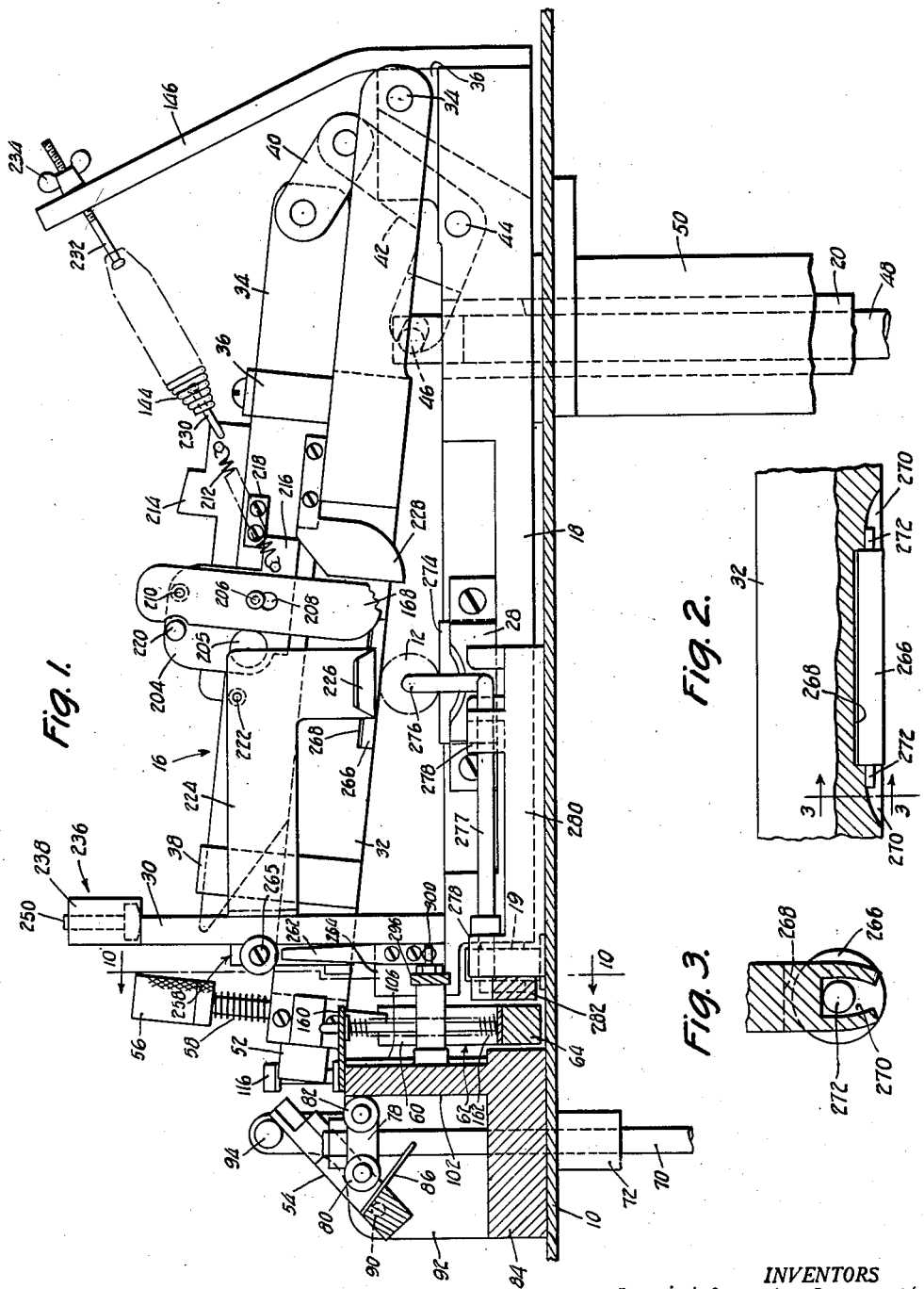
INVENTORS
Daniel Douglas Demarest,
Robert Merritt Perkins,
William Karius and
Carl Berendt.
BY Moses, Nolte, Crews & Berry
ATTORNEYS Feb. 8, 1955     D. D. DEMAREST ET AL     2,701,385
SAUSAGE SEVERING AND SKINNING MECHANISM
Filed Dec. 27, 1952     7 Sheets-Sheet 2

Fig. 4.

INVENTORS
*Daniel Douglas Demarest,
Robert Merritt Perkins,
William Karius and
Carl Berendt.*

BY *Moser, Nolte, Acews & Berry*
ATTORNEYS

Feb. 8, 1955
D. D. DEMAREST ET AL
2,701,385
SAUSAGE SEVERING AND SKINNING MECHANISM
Filed Dec. 27, 1952
7 Sheets-Sheet 3
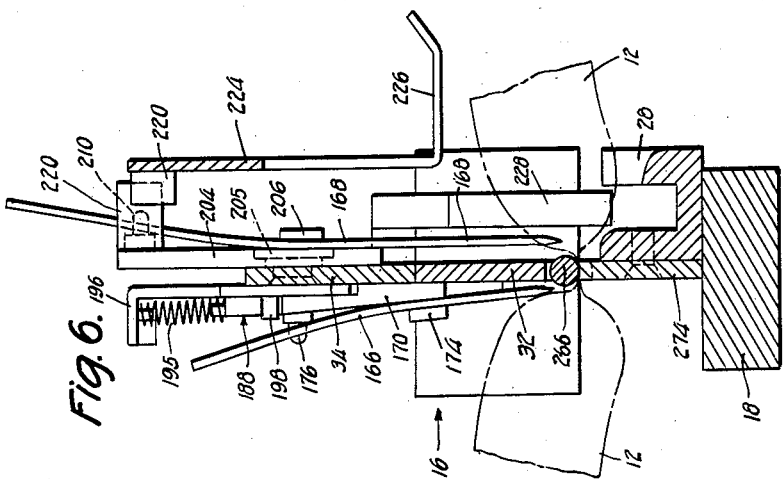
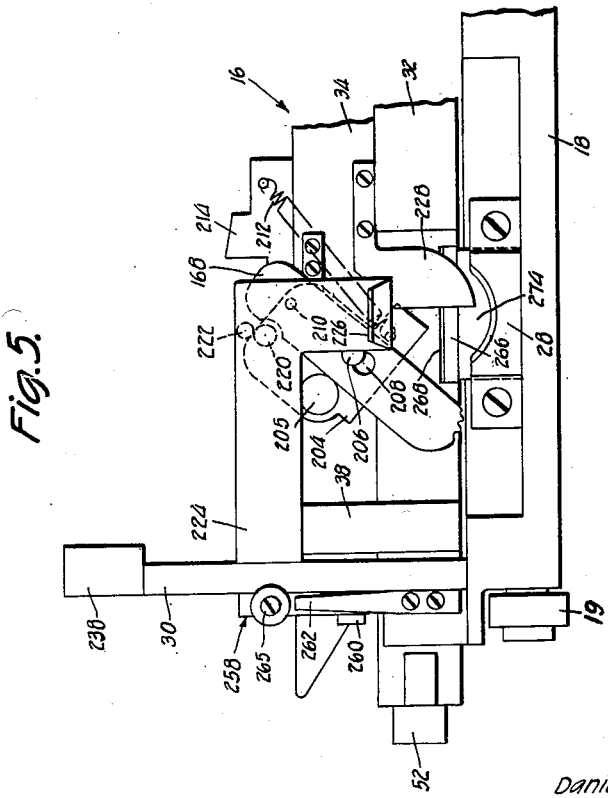
INVENTORS
Daniel Douglas Demarest,
Robert Merritt Perkins,
William Karius and
Carl Berendt.
BY Moses, Nolte, Crews & Berry
ATTORNEYS Feb. 8, 1955   D. D. DEMAREST ET AL   2,701,385
SAUSAGE SEVERING AND SKINNING MECHANISM
Filed Dec. 27, 1952   7 Sheets-Sheet 4
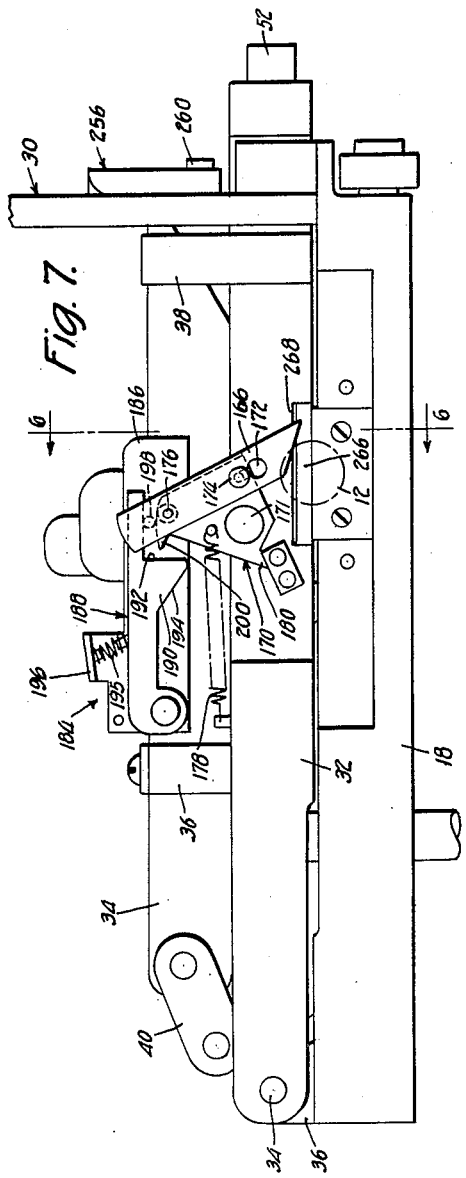
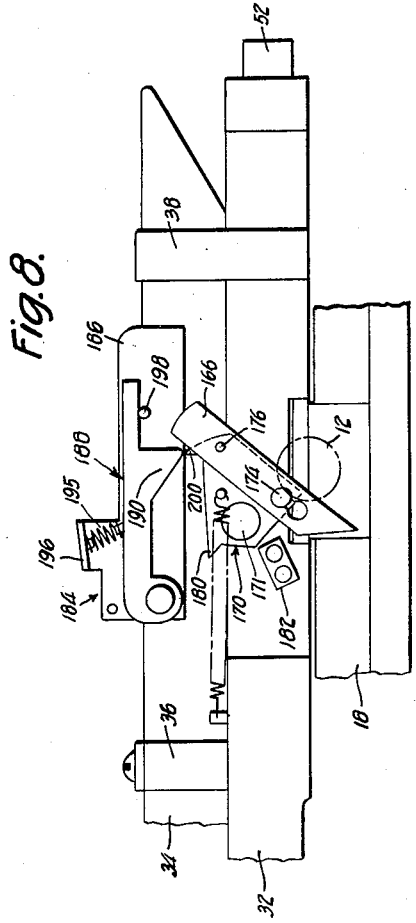
INVENTORS
Daniel Douglas Demarest,
Robert Merritt Perkins,
William Karius and
Carl Berendt.
BY Moses, Nolte, Crews & Berry
ATTORNEYS Feb. 8, 1955  D. D. DEMAREST ET AL  2,701,385
SAUSAGE SEVERING AND SKINNING MECHANISM
Filed Dec. 27, 1952  7 Sheets-Sheet 5

INVENTORS
Daniel Douglas Demarest,
Robert Merritt Perkins,
William Karius and
Carl Berendt.
BY Moses, Nolte, Crews & Berry
ATTORNEYS

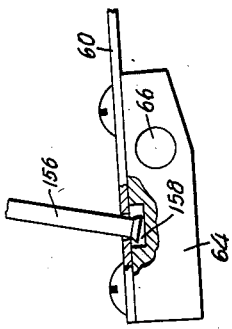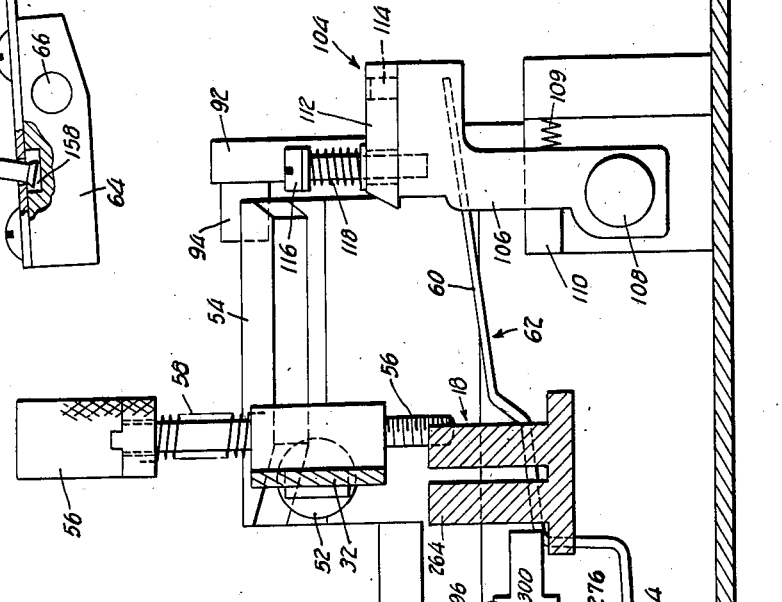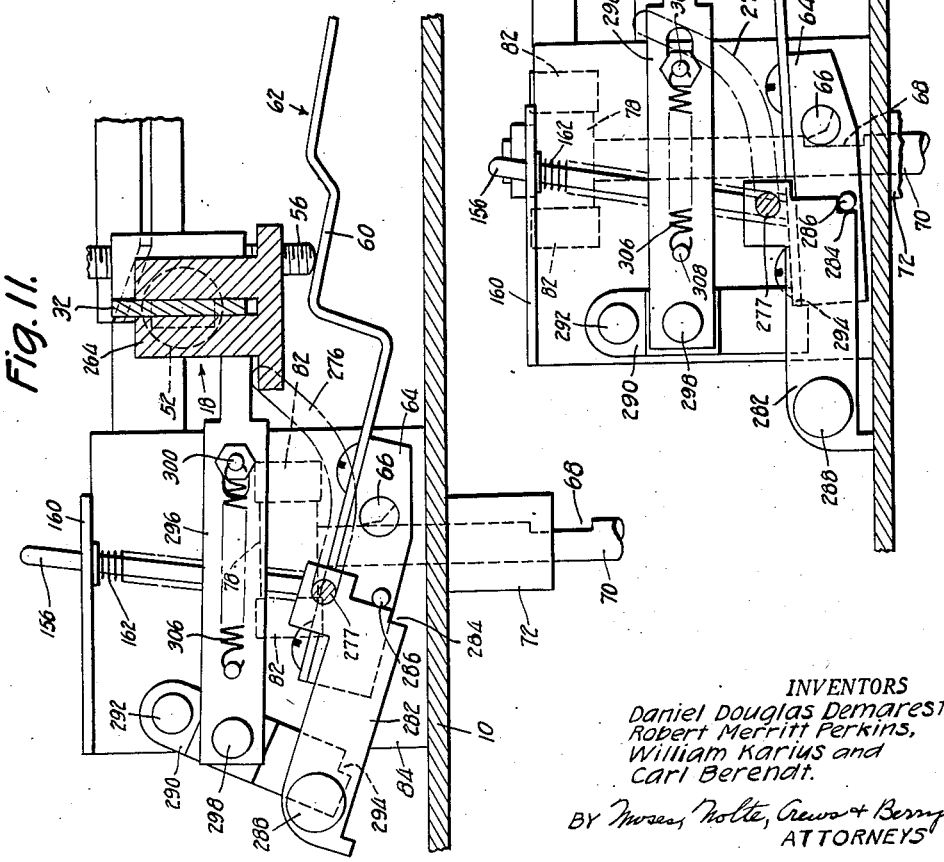

Feb. 8, 1955 D. D. DEMAREST ET AL 2,701,385
SAUSAGE SEVERING AND SKINNING MECHANISM
Filed Dec. 27, 1952 7 Sheets-Sheet 7
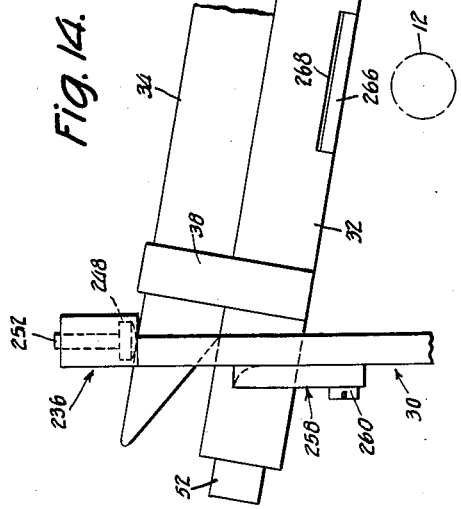
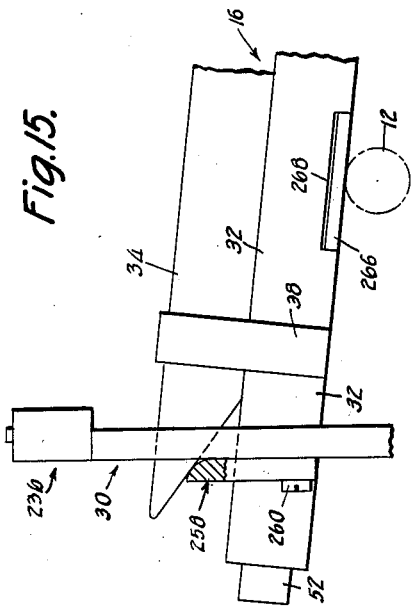
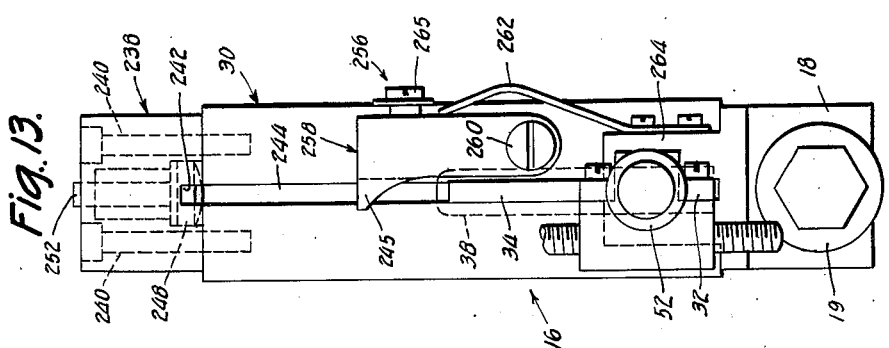
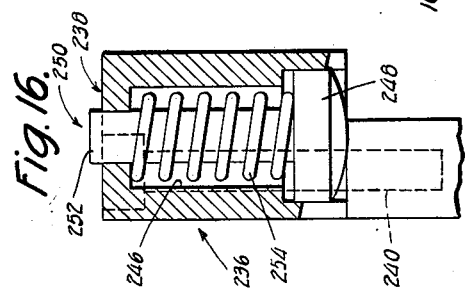
INVENTORS
Daniel Douglas Demarest,
Robert Merritt Perkins,
William Karius and
Carl Berendt
BY Moses, Nolte, Crews + Berry
ATTORNEYS United States Patent Office 2,701,385
Patented Feb. 8, 1955

2,701,385

SAUSAGE SEVERING AND SKINNING MECHANISM

Daniel Douglas Demarest, Port Washington, N. Y., and Robert Merritt Perkins, Upper Montclair, William Karius, Union, and Carl Berendt, Millburn, N. J., assignors to Linker Machines, Inc., Newark, N. J., a corporation of New York Application December 27, 1952, Serial No. 328,246

9 Claims. (Cl. 17—1)

This invention relates to mechanism for severing from one another, and skinning, links of a string of sausages, frankfurters or the like, the invention being concerned with improvements upon the machine disclosed and claimed in a joint application for letters patent of the United States of Daniel D. Demarest, Robert M. Perkins, William Karius and Carl Berendt, Serial No. 168,324, filed June 15, 1950, now Patent No. 2,672,646 issued March 23, 1954, for Apparatus and methods for Removing Casings from Sausages and the Like. While the present improvements are not necessarily confined in their application to the machine of said co-pending application, they will be illustratively explained and described by reference to that machine.

In the prior machine a string of frankfurters is advanced by feed rollers at constant speed toward a device which, for brevity, has become known in the art as the ripper head. The present improvements have to do with the construction and operation of the ripper head and with the control thereof. The ripper head in the present machine, as in the former one, comprises a lower jaw over which the frankfurters are advanced and upon which all the ripper head parts are carried. The lower jaw is normally stationary but is caused when tripped to swing forward about a vertical pivot in harmony with the rate of advance of the frankfurter string and then to return to rest automatically in the original position. An upper jaw, carried upon the lower jaw through a horizontal pivot, rides upon the frankfurters and starts a ripper head cycle when it encounters a thin neck or ligature between successive frankfurters.

When the upper jaw drops, it actuates hold down mechanism which clamps the upper jaw firmly in place upon the ligature. It also trips a clutch for initiating the forward movement of the ripper head, and for setting into operation a slide bar which is mounted on the upper jaw. As the ripper head swings forward the slide bar actuates a severing knife at the forward side of the upper jaw for cutting loose the leading frankfurter and releasing it to the action of peeling mechanisms which is not shown herein. The slide bar also actuates a ripper blade at the opposite side of the upper jaw, as the ripper head swings forward, to tear or rip the skin of the next frankfurter adjacent to the clamped ligature, in preparation for peeling, and to press a tab forming pusher against the leading end of such frankfurter, to extend the tear while the ligature is still clamped, and thereby to form a tab upon which the peeling mechanism may subsequently act for starting the peeling operation.

At the end of the forward stroke of the ripper head the hold-down mechanism which acts upon the upper jaw is released, and the upper jaw is caused to spring upward. As the ripper head is returned toward its normal, idle position, the upper jaw descends into engagement with the oncoming frankfurter in preparation for again performing the ripping and clutch tripping functions which have been described.

In the prior machine the upper jaw was free to fall with some violence upon the frankfurter. As a consequence it sometimes dug into the frankfurter body, hindering the advance of the frankfurter.

An important object of the present invention is the provision of mechanism for compelling the upper jaw to be lowered gradually and gently into engagement with the frankfurter, so that the frankfurter can never be dug into and be thereby retarded. To this end it is a feature that a top catch or pawl is provided, supported from the lower jaw in position to be cammed aside by the slide bar of the ripper head as the slide bar flies upward with the upper jaw at the end of the forward stroke of the ripper head. At that point in the cycle the nose of the slide bar, which has a sloping lower face, is projected outward well beyond the catch so that the slide bar cannot descend and is caused to hold the upper jaw up until the slide bar has been substantially retracted lengthwise of the upper jaw. As the ripper head returns to normal position the slide bar is gradually retracted and is thereby caused to permit the upper jaw to descend gradually onto the frankfurter.

It is a further feature that the upper jaw is provided with a roller for engaging the frankfurter as a further safeguard against interference by the upper jaw with the advance of the frankfurter.

In the prior machine it has sometimes happened that the clutch mechanism would be prematurely tripped, so that the ripper head cycle would be initiated before a ligature had come into position to be gripped. This resulted in mutilation of the frankfurter currently engaged by the ripper head and in the fouling of the machine.

In accordance with the present invention provision is made of a safety catch for preventing the tripping at the clutch before the ripper head has been fully restored to its normal position.

It is a further important feature of the present invention that mechanism has been provided for preventing the tripping of the clutch mechanism whenever the string of frankfurters runs out. Thus, the ripper head is caused to remain at rest until a fresh string is started into the machine. Because the ripper head is held idle the fresh string can be started in in properly timed relation with the ripper head.

Other objects and advantages will hereinafter appear.

In the drawing forming part of this specification.

Fig. 1 is a fragmentary view in sectional elevation of a portion of an illustrative machine which embodies features of the invention, the portion illustrated being that which acts on the frankfurter before peeling, the section being taken on the line 1—1 of Fig. 9, looking in the direction of the arrows;

Fig. 2 is an enlarged detail view, partly in section, of a roller employed in the mechanism of Fig. 1;

Fig. 3 is an enlarged vertical sectional view taken on the line 3—3 of Fig. 2, looking in the direction of the arrows;

Fig. 4 is a fragmentary view in sectional elevation showing the parts of the clutch, cam and hold-down mechanism;

Fig. 5 is a fragmentary view in elevation showing some of the parts of Fig. 1 operated to another position;

Fig. 6 is an enlarged fragmentary vertical sectional view taken on the line 6—6 of Fig. 7, looking in the direction of the arrows;

Fig. 7 is a fragmentary view in elevation, as seen from the delivery end of the machine;

Fig. 8 is a fragmentary view in transverse elevation showing some of the parts illustrated in Fig. 7 operated to another position;

Fig. 10 is a fragmentary vertical sectional view taken upon the line 10—10 of Fig. 9, looking in the direction of the arrows;

Fig. 11 is a view similar to Fig. 10 but shows a different operative condition of some of the parts;

Fig. 12 is a detail view partly broken away of a portion of the mechanism illustrated in Figs. 10 and 11;

Fig. 13 is a view in elevation of the ripper head as seen from the left side of Fig. 5;

Fig. 14 is a fragmentary view in elevation of some of the parts shown in Fig. 1, but with the parts operated to different positions;

Fig. 15 is a view similar to Fig. 14, partly in section, which shows the parts in still other positions; and Fig. 16 is an enlarged view, partly in section, of the buffer plunger.

Figure 9:
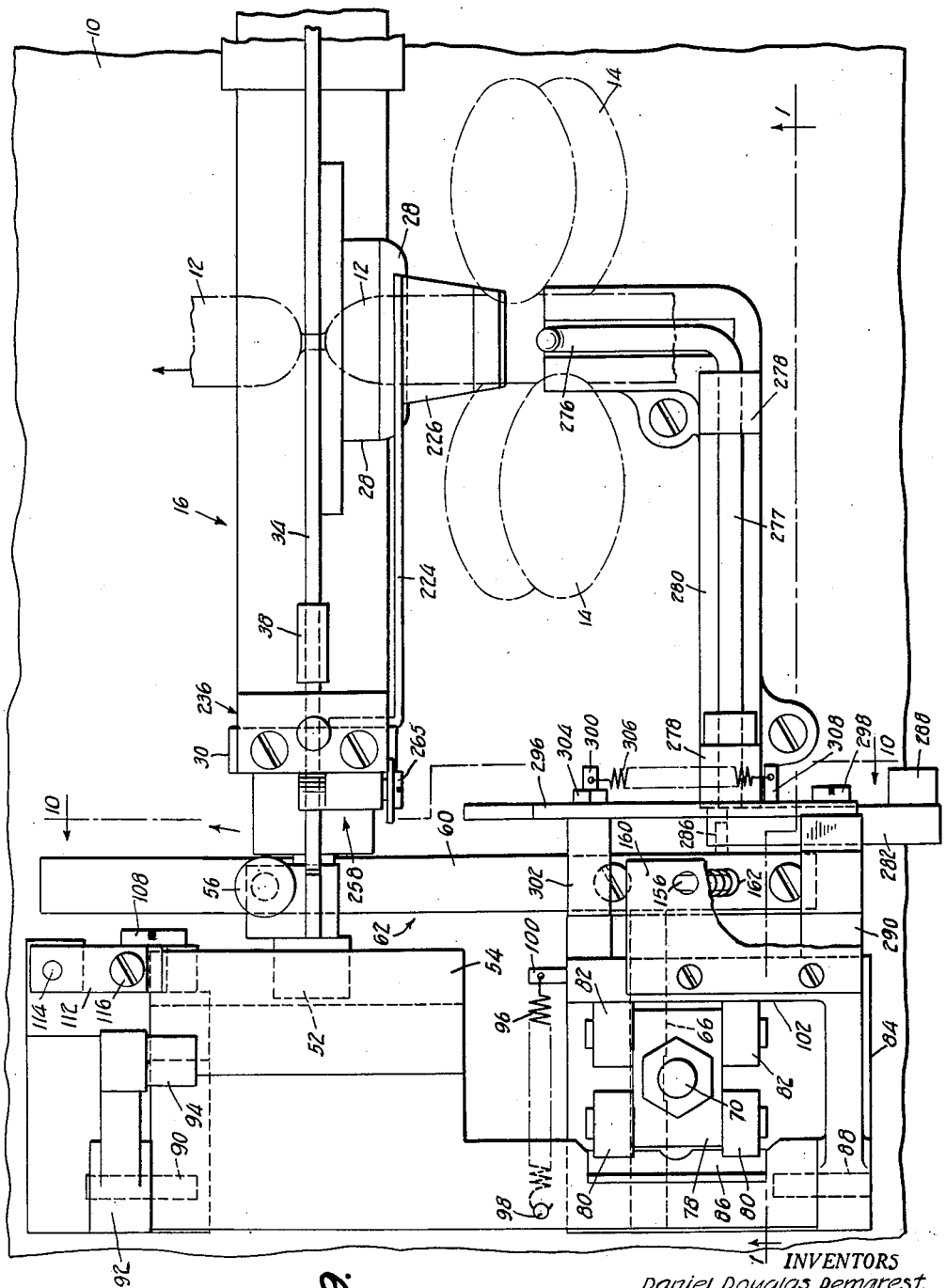
Fig. 9 is a fragmentary plan view of substantially the portion of the machine illustrated in Fig. 1.

The illustrative machine comprises a stationary base plate which is supported at a convenient height above the floor by a suitable framework (not shown). The frankfurters 12 of a string are advanced over the table 10 at constant speed by feed rollers 14 (see Fig. 9) toward a ripper head 16, the feed mechanism being the same as in Patent No. 2,672,646.

The ripper head 16 comprises a lower jaw 18 over which the frankfurter string rides, the jaw being provided at one end with a roller 19 to ride on the base plate 10. The lower jaw 18 is made fast upon the upper end of a vertically extending sleeve 20 (Fig. 1). The sleeve 20 has fast with it an arm 22 which carries a cam follower 24 (Fig. 4), through which it is actuated from time to time by a cam (not shown) which is fast upon a cam shaft 26.

The lower jaw 18 has affixed to it a lower, notched guide 28 over which the frankfurter string approaches the lower jaw. Also secured upon the lower jaw is an upwardly extending vertical guide 30 through which an upper jaw 32 extends. The upper jaw 32 is supported through a horizontal pivot pin 34' upon a tail portion 36 of the lower jaw 18. Thus, the upper jaw 32 participates in the horizontal oscillation of the lower jaw 18 but is also free to oscillate vertically from and towards the lower jaw. The upper jaw 32 supports and guides a slide bar 34 with capacity for movement lengthwise of itself. Guides 36 and 38, carried by the upper jaw 32, are provided for guiding the bar 34.

The slide bar 34 is connected through a link 40 to the upper arm of a bell-crank 42. The bell-crank 42 is pivotally supported upon the lower jaw 18 through a horizontal pivot pin 44.

The lower arm of the bell-crank 42 is slotted at its end and embraces a cross pin 46 of a vertical rod 48. The rod 48 extends through the sleeve 20 from end to end of the sleeve. The rod 48 is guided for vertical movement by the sleeve 20, and the sleeve 20 is guided for rocking movement within a stationary sleeve 50.

The upper jaw 32 carries at its outer end a roller 52 which is adapted to run beneath, and be held down by a hold-down plate 54 as the ripper head swings forward. It is thus that the upper jaw 32 is caused to clamp the ligature between frankfurter links firmly down against the lower jaw 18.

In Fig. 1, the parts are shown in the positions which they would occupy with the ripper head stationary and the upper jaw riding on the body of a frankfurter. As the ligature between frankfurter links approached the ripper head the upper jaw descended and is finally separated from the lower jaw only by the ligature. In the course of this descent an abutment screw 56, which is adjustably carried by the upper jaw 32, moved downwards. The shank of the screw 56 is threaded through the upper jaw 32 and projects a substantial distance below it.

A compression coil spring 58 surrounds the screw shank between the jaw 32 and the head of the screw, and helps to prevent loss of adjustment.

As the upper jaw 32 descends the lower end of the screw 56 engages a plate or bar 60 (Figs. 1, 9 and 10) which forms a portion of a tripping or starting lever 62, through which the upper jaw is caused to be locked down, and an operating cycle of the ripper head is initiated. The lever 62 also comprises a block 64 to which the plate 60 is rigidly attached, and a pin 66 which is made unitary with the block.

A portion of the pin 66 normally occupies a notch 68 of a rod 70, to maintain the rod in an elevated position. This portion of the pin 66 is cut away along two chords as indicated in Fig. 10. When the lever 62 is rocked downward by the screw 56, the pin 66 is rocked clockwise into a position to clear the rod 70. The rod 70 extends downward through the table 10 and through a guide collar 72 affixed to the lower side of the table. A compression coil spring 74 (Fig. 4) bears at its upper end against the collar 72 and at its lower end against a collar 76 on the rod 70 near the lower end of the rod. The spring 74 constantly urges the rod 70 downward. Downward movement of the rod is prevented when the parts are in the positions illustrated in Fig. 10, but as soon as the pin 66 is turned to clear the rod 70 the rod springs downward. The rod 70 has rigidly secured to its upper end a head member 78 (Figs. 1, 4 and 9) upon which two rollers 80 and two rollers 82 are supported for rotation about horizontal axes. A block or bracket 84 is secured upon the upper face of the plate 10 and serves further to guide the rod 70.

The head member 78 normally stands at the level indicated in Fig. 1, clear of the hold-down plate 54, but in a position to engage an inclined operating arm 86 of the plate 54 when the rod 70 is released by the pin 66 and thrust downward by the spring 74. The plate 54 is supported normally in the upwardly inclined attitude shown in Fig. 1, being mounted on pivot pins 88 and 90 (Fig. 9) carried respectively by the block 84 and a block or bracket 92, and held upward against a stop pin 94 by a tension spring 96. The spring 96 is connected at one end to a pin 98 which is affixed to the lower side of the plate 54, and at the opposite end to a stationary pin 100.

When the rod 70 springs downward the rollers 80 move downward along the arm 86, rocking the holddown plate 54 into the position shown in Figs. 4, 9 and 11, with a beveled off end of the plate 54 overlying the roller 52. Throughout this movement the rollers 82 bear against a vertical guide face 102 of the block 84, resisting any tendency of the arm 86 to bend and bind the rod 70. The plate 54 is held down throughout the forward stroke of the ripper head, but the rod 70 is restored to its upper position during that stroke so that the plate can spring upward at the conclusion of that stroke. A spring catch 104 is accordingly provided for detaining the plate 54 in its depressed position.

The catch 104 (Fig. 10) comprises an arm 106, pivotally supported upon a pin 108 which is affixed to the block 92. A compression coil spring 109 urges the arm 106 yieldingly in a counter-clockwise direction against an abutment 110. A keeper bar 112 is supported on top of the arm 106 and projects leftward beyond the left hand face of the upper end of the arm 106. The bar 112 is fitted loosely onto a pin 114 and is formed with an opening through which the shank of a screw 116 passes freely. The screw is threaded into the arm 106. A compression coil spring 118 surrounds the shank of the screw bearing at its upper end against the screw head and at its lower end against a washer which overlies the keeper bar. The nose of the keeper bar 112 has a beveled upper face so that the catch can be cammed aside by the plate 54 against the resistance of the spring 109 as the plate 54 descends. As soon as the plate 54 has moved below the keeper bar 112, the spring 109 projects the latch to cause the keeper bar to overlie and detain plate 54.

The spring 118 limits to a predetermined, selected value the force with which the keeper bar 112 bears against the upper face of the plate 54. As the end of the forward stroke of the ripper head the roller 52 actuates the catch 104 to shift the keeper bar 112 clear of the plate 54. The fact that the keeper bar is held down with limited force against the plate 54 by the spring 112 prevents binding, and hence assures the release of the plate 54 as intended.

The ripper head, which is normally idle, is operated from the cam shaft 26. A Hilliard one revolution clutch (disclosed in Serial #168,324) tends to drive the cam shaft 26 in a clockwise direction, but such movement is restrained by a nose 120 (Fig. 4) on one arm of a bell-crank 122 which engages a single tooth disc 124 yieldably mounted on the clutch. The other arm of the bell-crank 122 is connected through a pivot pin 126 on a block 128 to the rod 70. The rod 70 passes through the block 128, and the block is clamped on the rod between the collar 76 and a nut 130 which is threaded on the lower end of the rod. When the rod 70 moves downward the bell-crank 122 is rocked counterclockwise as seen in Fig. 4, to release the disc 124 which engages the clutch to rotate shaft 126.

The cam shaft 126 has fast upon it a track cam 132 which acts upon a follower roller 134. The roller 134 is carried by a crank 136 which is fast upon a shaft 138. The shaft 138 also has fast upon it a lever 140, one arm of which engages a grooved collar 141 secured to the lower end of the rod 48 and the other end of which is provided with a side arm 142 which underlies the lower arm of the bell-crank 122. The rod 48 is effective, as will be explained, to actuate the slide bar 34 out and then in along the upper jaw, and so to operate the severing blade and the ripper blade, and then to restore them to the normal position.

The side arm 142 acts during the first half revolution of the cam shaft to restore the rod 70 to its elevated position. The rod 70 reaches its highest position just at the end of the first half revolution of the cam shaft, at which instant the hold-down plate 54 is released by the withdrawal of the catch 104. The plate 54 thereupon springs upward and leaves the upper jaw 32 and the slide bar 34 free to swing upward. A spring 144 is connected at one end to the slide bar 34 and at the other end to a post 146 which extends upward from the rear end of the lower jaw 18. This spring becomes tensioned by the sliding movement of the slide bar 34 outward along the upper jaw 32 which occurs during the first half cycle of the ripper head. When the plate 54 springs upward, therefore, the upper jaw 32 and the slide bar 34 spring upward together (Fig. 14). The screw 56 (Fig. 1) is moved to an elevated position out of the way of the releasing bar 60. The lever 62 is thereupon rocked counter-clockwise to turn the pin 66 into position to relock the rod 70 in its raised position.

For this purpose a headed guide rod 156 (Figs. 10 and 12) has its head loosely lodged in a recess 158 which is formed in the upper part of the block 64, and its shank passed upward through a hole in the bar 60, which hole is too small to pass the head of the guide rod. The upper end of the rod 156 passes freely through a stationary plate 160. A compression coil spring 162 surrounds the rod 156, bearing at one end against the plate 160 and at the other end against the bar 60. The tendency of the spring 162 is to turn the lever 62 counter-clockwise, thereby to place the pin 66 in its locking position.

The relocking of the rod 70 in its raised position causes the bell-crank 122 (Fig. 4) to be retained with its nose 120 in position to intercept the disc 124, release the clutch, and thus arrest operation of the cam shaft 26 and of the ripper head at the conclusion of one complete revolution of the cam shaft.

As the rotation of the cam shaft 26 begins the resultant rocking of the shaft 138 in a clockwise direction causes the lever 140 to pull the rod 48 downward. The lever 140 has a cleft pivotal connection with the rod 48. Downward movement of the rod is effective through the bell-crank 42 and the link 40, to thrust the slide rod 34 outward along the upper jaw 32, for actuating the severing blade 166 and the ripper blade 168 during the first half of the ripper head cycle.

The normal position of the severing blade 166 is illustrated in Fig. 7, while the extreme actuated position of the blade is illustrated in Fig. 8. The blade 166 is removably supported in fixed position upon a rockable, generally triangular carrier plate 170, the plate 170 being pivoted on a headed stud 171 secured to the upper jaw 32, see Fig. 6 also. The blade 166 is provided with a keyhole slot 172. With the blade flexed, the large end of the slot 172 is passed around the head of a headed pin 174 on the plate 170. The blade 166 is then slid along the plate 170 to lodge the narrow part of the slot 172 beneath the head of the pin 174. The flexed end of the blade 166 is then permitted to snap inward against the plate 170, a hole formed in the blade 166 being thus caused to fit around a pin 176 on the plate 170. A tension coil spring 178 is connected at one end to the upper jaw 32 and at the opposite end to the plate 170. The spring 178 urges the plate 170 counter-clockwise (Fig. 7) to its normal position, with a projection 180 of the plate bearing against a fixed abutment 182 on the jaw 32.

Actuating mechanism 184 for the plate 170 is mounted on the slide bar 34. A mounting plate 186, affixed to the slide bar 34, pivotally supports a pawl 188. The pawl 188 includes a nose 190 which has an abrupt forward face 192 and a sloping rear face 194. A compression coil spring 195 is interposed between the pawl 188 and an abutment lip 196 of the mounting plate 186 and normally holds the pawl pressed down against a stop pin 198 on the mounting plate 186.

As the slide bar 34 is thrust outward the pawl 188 engages a projection 200 of the plate 170 and rocks the plate clockwise to carry the severing blade 166 from the position illustrated in Fig. 7 to that illustrated in Fig. 8. In the course of this movement the severing blade 166 cuts across the ligature, severing the leading frankfurter, which has already passed the severing blade, from the string of frankfurters. In Figure 8 the projection 200 of the plate 170 is just moving clear of the pawl nose 190, so that the plate 170 is just being freed to snap back to the normal position in which it is shown in Fig. 7. During the return stroke of the slide bar 34 the pawl 188 is cammed aside by the plate 170, so that the pawl can be returned without interference to its normal position as illustrated in Fig. 7.

The construction, mounting and operation of the ripper blade 168 are illustrated in Figs. 1, 5 and 6. The blade 168 is supported upon a rockably mounted plate 204 which is pivotally carried upon the slide bar 34 by a headed stud 205. The blade 168 is a flexible, resilient blade like the blade 166, and like the blade 166 it is secured to its mounting plate through a headed pin 206 on the mounting plate which cooperates with a keyhole slot 208 on the blade, and a jig pin 210 on a mounting plate which is received in a hole formed in the blade.

The normal position of the plate 204 relative to the slide bar 34 is illustrated in Fig. 1. A tension coil spring 212 connected to the plate 204, and to a bracket 214 fast on the slide bar 34, urges the plate 204 in a counter-clockwise direction, maintaining a projection 216 of the plate 204 in engagement with a fixed abutment 218 upon the slide bar.

The upper jaw 32 and the slide bar 34 are illustrated in Fig. 1 in raised position. When they have been lowered and clamped down, however, a pin 220 on the plate 204 is lowered into line with a stationary pin 222 which is carried on a bracket 224. The bracket 224 is made fast upon the vertical guide 30 and includes a side extension 226 which forms an upper frankfurter guide between the rollers 14 and the ripper head. As the slide bar 34 moves outward along the upper jaw 32, the pin 222 stands in the way of the pin 220, and this causes the plate 204 to be rocked from the position illustrated in Fig. 1 to that illustrated in Fig. 5. This causes the ripper blade to travel across, and cut partly through, the skin on the nose of the frankfurter at the side of the ripper head which is approached by the frankfurters.

At the conclusion of the outward movement of the slide bar a pusher 228 fixed on the slide bar pushes against the frankfurter with the ligature still clamped, to extend the tear which has been started by the ripper blade and thereby form a tab upon which the peeling mechanism can act effectively. As shown in Fig. 5, the pin 220 is just moving clear of the pin 222, so that the plate 204 is about to the snapped back to its normal position relative to the slide bar 34 by the spring 212.

As the parts are shown in Fig. 1 the upper jaw 32 is riding upon a frankfurter and the slide bar 34 is so far retracted relative to the lower jaw that the spring 144 is completely unstressed. In fact, considerable lost motion will have to be taken up in the connections of the spring 144 before the spring will begin to be put under stress. The spring at its opposite ends is of contracted diameter and headed pins 230 and 232 have their heads trapped within the space which is surrounded by the coils of the spring. The heads of the rods are free to move within the coil when the spring is slack, but they cannot be pulled out through the end turns by the forces encountered in normal operation. The pin 230 is pivotally connected to the bracket 214 on the slide bar 34, while the pin 232 has a threaded portion passed through the post 146 and threaded through a nut 234. There is sufficient lost motion in the spring connection to permit the upper jaw 32 and the slide bar 34 to be lowered to the clamping position without encountering opposition from the spring 144 when the slide bar 34 is retracted relative to the upper jaw 32 as shown in Fig. 1.

When the upper jaw has been lowered and clamped however, and a cycle of the ripper head has been started, the slide bar 34 through its outward movement along the upper jaw 32 places the spring under a strong tension. When, therefore, the upper jaw is released by the successive actions of the keeper bar 112 and the hold down plate 54, the spring 144 jerks the slide bar 34 and the upper jaw 32 violently upward. The slide bar strikes a buffer 236 with some violence and rebounds forcibly from the buffer, thereby tending to hurl the lower jaw 32 downward with great force against the oncoming frankfurter.

The buffer 236 is of novel construction. It is also a salient feature of the present invention that provision is made of means for compelling the upper jaw to be lowered gently onto the frankfurter.

The buffer 236 comprises a block 238 which is secured upon the upper end of the guide 30 by headed screws 240. The block 238 is formed with a slot 242 (Fig. 13) which forms a continuation of a guide slot 244 formed in the guide 30. The upper jaw 32 and the slide bar 34 travel along the slot 244, and the slide bar is free to enter, and does enter, the slot 242. The block 238 is formed with a two diameter bore 246. The lower end of the bore 246, which is the part of larger diameter, receives and guides the head 248 of a buffer plunger 250. A stem 252 of the plunger passes upward through an opening in the upper end of the block 238. A compression coil spring 254 surrounds the stem 252 and bears against the plunger head to force the plunger downward with its head normally in engagement with the guide 30 and in a position to intercept the slide bar 34 as the latter flies upward. The head 248 may be formed of nylon, which is both wear resistant and shock absorbing.

For preventing violent downward rebound of the jaw 32 and the slide arm 34, a slow descent catch 256 (Figs. 1, 13 and 14) is provided. The catch comprises a pivoted arm 258 which is mounted by means of a pivot screw 260 on the face of the guide 30 which is remote from the ripper head pivot. The arm 258 is supported at one side of the slot 244, but includes a cam portion 245 which normally extends across the slot. A leaf spring 262, affixed at its lower end to a projection 264 of the lower jaw 18, bears against the arm 258 and presses the arm in a counter-clockwise direction as the parts are viewed in Fig. 13. A flanged, headed screw 265 is threaded into the arm 258 and has its flange disposed to engage a side face of the guide 30 for limiting counter-clockwise swinging of the arm 258.

When the parts are in the Fig. 1 condition the slide bar 34 is so far retracted relative to the upper jaw that its tip barely enters the slot of the guide 30. The upper jaw 32 can then be lowered onto the ligature as the frankfurter diameter contracts without the slide bar engaging the slow descent catch 256. The slide bar 34 therefore descends freely with the upper jaw until the upper jaw has become locked down and the ripper head has been set into operation. Then, as the slide bar 34 is thrust outward, the outer end of the bar is thrust beneath and beyond the slow descent catch 256. When, at the end of the forward stroke of the ripper head, the upper jaw is released, the slow descent catch lies squarely in the way of the slide bar.

The catch is readily cammed aside by the slide bar as the slide bar flies upward, but it returns to obstruct the descent of the slide bar. The slide bar 34 and the upper jaw 32 are arrested in their descent before the jaw 32 has engaged a frankfurter. As the second half of the ripper head cycle continues the slide bar 34 is slowly withdrawn along the upper jaw 32, and hence is slowly withdrawn relative to the slow descent catch. The lower face of the slide bar is beveled as shown, so that the upper jaw 32 is lowered gradually onto the frankfurter. After the upper jaw has engaged the frankfurter as in Fig. 15, the slide bar 34 continues to recede to the position shown in Fig. 1, in which it is free to move down to clamping position without further engaging the slow descent catch.

The present machine embodies a further novel feature for preventing obstruction of the frankfurter feed. Instead of permitting the upper jaw 32 directly to engage the frankfurter, the jaw is equipped with an idler roller 266 as shown in Figs. 2 and 3. The jaw 32 is formed with a notch 268 in which the roller is received. Beyond the end of the notch the jaw is formed with channels 270 in which bearing pins 272 of the roller are received. The comparatively thin jaw walls which bound the channel 270 are permanently deformed toward one another as shown in Fig. 3 for retaining the bearing pins 272 in place. The roller 266 avoids retardation which would otherwise occur from time to time.

The lower jaw 18 is provided with a hardened steel insert 274 for engaging the frankfurter in opposition to the roller 266. The insert is wear resisting and can be replaced as required.

In the former machine, when the string of frankfurters ran out, the upper jaw was free to descend and to start a new cycle of the ripper head as soon as the previous cycle was completed. This was not a desirable mode of operation, both because it subjected the parts to unnecessary wear, and because it interfered with the introduction of a fresh string of frankfurters in properly timed relation to the operation of the ripper head. It is a feature of the present invention that operation of the ripper head is prevented when the frankfurter string runs out.

A feeler 276 (Figs. 1, 9, 10 and 11) extends upward into the frankfurter path at the introductory side of the ripper head, into position to be engaged and depressed by an oncoming frankfurter. The feeler 276 takes the form of a bent wire having a horizontal portion 277 which is pivotally supported in ears 278 of a bracket 280, the bracket being attached to the upper face of the plate 10. The axial portion of the feeler wire has affixed to it a catch arm 282 formed with a notch 284 which normally overlies a pin 286 on the block 64 of the releasing lever 62. A weight 288 affixed to the catch arm overweighs the feeler portion of the wire and urges the feeler 276 up across the frankfurter path. When no frankfurter is in position to depress the feeler the feeler stands up, and the pin 286 lies in the notch 284 as in Fig. 10. The thrust exerted by the pin 286 against the arm 282 is substantially toward the pivotal axis of the arm 282. The arm 282, therefore, positively prevents tripping of the release lever 62, thereby preventing the initiating of a ripper head cycle. When the feeler 276 is depressed by a frankfurter, however, the arm 282 is rocked out of the way of the pin 286, as in Fig. 11, and the release lever 262 is free to function in the normal manner.

In the prior machine it sometimes happens that the operator accidentally or unintentionally depresses the upper jaw during the second half of the ripper head cycle with sufficient force to start a new and mistimed cycle of the ripper head. This is a very undesirable occurrence because it results in fouling the machinery and mutilating the frankfurters. It is an important feature of the present machine that provision has been included for preventing this kind of accident.

A detaining arm 290 (Figs. 9, 10 and 11) is pivotally supported from the block 84 by a pivot pin 292. The arm 290 is formed with a notch 294 which is movable into and out of position to overlie the upper left-hand corner of lever 62 as the parts are seen in Figs. 10 and 11. Normally the arm 290 is held out of the way of the lever 62 by a bar 296, as shown in Fig. 11, so that the lever 62 can be depressed by the screw 56, also as shown in Fig. 11. The bar 296 is supported at one end on the arm 290 through a pivot pin 298. At the opposite end the bar is provided with a slot which receives a pin 300 that projects axially from a post 302 on the block 84. A head 304 forming part of the pin 300, guides the bar 296 for sliding movement on the pin 300. A tension coil spring 306 is connected at one end to the pin 300 and at the opposite end to a pin 308 on the bar 296. The spring 306 urges the bar 296 and the arm 290 toward the right as the parts are viewed in Figs. 10 and 11. With the ripper head at rest the part 264 of the lower jaw 18 engages the right-hand extremity of the bar 296 to hold the arm 290 in the position illustrated in Fig. 11.

It is only when the arm 290 is in the position of Fig. 11 that the release lever 62 can be depressed as shown; in other words when the ripper head is returned to its normal position about the axis of the sleeve 20. Such depression of the release lever starts a ripper head cycle, causing the part 264 of the lower jaw 18 to move away from the bar 296. The spring 206 immediately pulls the arm 290 toward the right, but it cannot pull it completely to the Fig. 10 position because of the obstruction interposed by the depressed release lever 62. When the release lever is restored to its raised position at the conclusion of the first half cycle of the ripper head, however, the arm 290 snaps into place over the tail of the lever 62, making it impossible again to depress the lever until after the current ripper head cycle is completed. As the ripper head cycle is completed, the part 264 returns to the Fig. 11 position, thrusts the bar 296 leftward, and thereby terminates the restraint imposed upon the lever 62 by the arm 290.

In the illustrative machine the buffer plunger head 248 and the slow descent catch arm are made of nylon in order to provide the maximum resistance to wear.

I have described what I believe to be the best embodiments of my invention. I do not wish, however, to be confined to the embodiments shown, but what I desire to cover by Letters Patent is set forth in the appended claims.

I claim:

1. In a machine for severing sausages one by one from the leading end of a string of sausages and for skinning each sausage after it has been severed, in combination, a normally idle ripper head, means operatively related to the ripper head for advancing the sausage string to and through the ripper head, means operatively associated with the ripper head for moving said ripper head in its entirety first to advance it with the advancing string and then to return it to normal position, the ripper head comprising a string riding, vertically movable jaw, and a slide bar supported on said jaw, means guiding the slide bar for movement longitudinally of said jaw but constraining the jaw and slide bar to move up and down together, means responsive to descent of the jaw onto a ligature between links to lock the jaw down, and to initiate a ripper head cycle of operation, means associated with the jaw for releasing the jaw and hurling it upward as the ripper head completes its forward movement, and means cooperative with the slide bar to retain the jaw in an elevated position and to lower it gradually onto the next sausage of the string as the ripper head returns to normal position.

2. In a machine for severing sausages one by one from the leading end of a string of sausages and for skinning each sausage after it has been severed, a normally idle ripper head, means operatively related to the ripper head for advancing the sausage string to and through the ripper head, means operatively associated with the ripper head for moving said ripper head in its entirety first to advance it with the advancing string and then to return it to normal position, the ripper head comprising a string riding, vertically movable jaw, and a slide bar movable vertically with the jaw and longitudinally relative to the jaw, means responsive to descent of the jaw onto a ligature to lock the jaw down and to initiate a ripper head cycle of operations, means associated with the jaw for releasing the jaw and hurling it upward as the ripper head completes its forward movement, and means cooperative with the slide bar to retain the upper jaw in an elevated position, and to lower it gradually onto the next sausage of the string as the ripper head returns to normal position.

3. In a machine for severing sausages one by one from the leading end of a string of sausages and for skinning each sausage after it has been severed, in combination, a normally stationary ripper head, means operatively associated with the ripper head for advancing the sausage string to and through the ripper head, means associated with the ripper head for oscillating the ripper head in its entirety to advance it in unison with the advancing string, and then to return it relative to the string to initial position, said ripper head comprising upper and lower clamping jaws, the upper jaw being vertically movable toward and from the lower jaw and free to ride upon a sausage link as a ligature between links approaches the jaws, means responsive to descent of the upper jaw onto a ligature to lock the upper jaw down in ligature clamping position, and to initiate a ripper head cycle, means on the ripper head for severing the first link from the string, and for starting a tear in the clamped ligature appendage of the following link as the ripper head moves forward with the string, including a slide bar, means carried by the upper jaw for constraining the slide bar to move forward in unison with the upper jaw while guiding the slide bar for movement longitudinally of said jaw, means associated with said slide bar for advancing the slide bar outward along the upper jaw as the ripper head moves forward and for retracting it as the ripper head moves backward, means operatively associated with said upper jaw and said slide bar for causing the upper jaw and the slide bar to rise together at the conclusion of the forward movement of the ripper head, a slow descent catch supported from the lower jaw above the slide bar, the catch being spring urged to a slide bar intercepting position and being constructed to be cammed aside by the slide bar as the slide bar moves upward, and to positively arrest the descent of the slide bar before the upper jaw has descended onto a sausage link, the slide bar having an inclined surface engageable with the catch to permit the lower jaw to be set gently onto a sausage link as the slide bar is retracted, and finally to descend to ligature clamping position when the slide bar through its continued retraction has been moved clear of the catch.

4. In a machine for severing sausages one by one from the leading end of a string and for skinning each sausage after it has been severed, in combination, a normally stationary ripper head, means operatively related to the ripper head for advancing the sausage string to and through the ripper head, said ripper head including a vertically movable jaw which rides upon the sausage string, a tripper responsive to descent of the jaw into ligature engaging position for initiating a cycle of ripper head operations in which the ripper head as a whole is moved first to advance it in unison with the advancing string and then to return it to initial position, and means operatively associated with the tripper for rendering the tripper unresponsive to the jaw until after the ripper head cycle has been completed.

5. In a machine for severing sausages one by one from the leading end of a string and for skinning each sausage after it has been severed, in combination, a normally stationary ripper head, means operatively related to the ripper head for advancing the sausage string to and through the ripper head, said ripper head including a vertically movable jaw which rides upon the sausage string, a tripper responsive to descent of the jaw into ligature engaging position for initiating a cycle of ripper head operations in which the ripper head as a whole is moved first to advance it in unison with the advancing string and then to return it to initial position, means operatively associated with the tripper for restoring the tripper to its normal position at the conclusion of the forward movement of the ripper head, a catch automatically engageable with the tripper upon restoration of the tripper, to interfere with its being tripped as the ripper head returns to normal position, and means engaged and actuated by the ripper head at the conclusion of its return stroke for moving said catch to an ineffective position.

6. In a machine for severing sausages one by one from the leading end of a string and for skinning each sausage after it has been severed, in combination, a normally stationary ripper head, means operatively related to the ripper head for advancing the sausage string along a definite path to and through the ripper head, means for moving the ripper head in its entirety first to advance it in unison with the advancing string and then to return it relative to the string to its normal position, said ripper head including a member which rides upon the sausage string, a tripper responsive to the descent of said member into ligature engaging position for initiating a cycle of ripper head operations, and means operatively associated with the tripper for locking the tripper against operation when the string runs out.

7. In a machine for severing sausages one by one from the leading end of a string and for skinning each sausage after it has been severed, in combination, a normally stationary ripper head, means operatively related to the ripper head for advancing the sausage string along a definite path to and through the ripper head, means associated with the ripper head for moving the ripper head in its entirety first to advance it in unison with the advancing string and then to return it relative to the string to its normal position, said ripper head including a member which rides upon the sausage string, a tripper responsive to the descent of said member into ligature engaging position for initiating a cycle of ripper head operations, and means operatively associated with the tripper for locking the tripper against operation when the string runs out, comprising a catch engageable with the tripper to prevent tripping operation of the tripper, a sausage feeler movable into and out of the sausage path, means biasing the feeler in a direction to cause it to stand in the sausage path, and means operatively connecting the feeler with the catch to prevent operation of the tripper when the feeler is in the sausage path, but to permit operation of the tripper when the feeler is held down out of said path by a sausage.

8. In a machine for severing sausages one by one from the leading end of a string and for skinning each sausage after it has been severed, in combination, a normally stationary ripper head, means operatively related to the ripper head for advancing the sausage string to and through the ripper head, means associated with the ripper head for moving the ripper head in its entirety first to advance it in unison with the advancing string and then to return it relative to the string to its normal position, said ripper head including a jaw which normally rides upon the sausage string, and a roller mounted for rotation in said jaw and constituting the sausage engaging part of the jaw to facilitate advance of the sausage relative to the jaw.

9. In a machine for severing sausages one by one from the leading end of a string and for skinning each sausage after it has been severed, in combination, a normally stationary ripper head, means operatively related to the ripper head for advancing the sausage string to and through the ripper head, means associated with the ripper head for moving the ripper head in its entirety first to advance it in unison with the advancing string and then to return it relative to the string to its normal position, said ripper head including a jaw which normally rides upon the sausage string, and a roller mounted for rotation in said jaw and constituting the sausage engaging part of the jaw to facilitate advance of the sausage relative to the jaw, the roller being located in a notch of the jaw and having bearings which extend axially beyond the roller, the jaw having channels beyond said notch in which the bearings are located, the channel walls being permanently deformed toward one another to entrap the bearings between them.

References Cited in the file of this patent

UNITED STATES PATENTS

| | | |
|---|---|---|
| 2,434,316 | Golden et al. | Jan. 13, 1948 |
| 2,463,157 | Deitrickson | Mar. 1, 1949 |
| 2,514,660 | McClure et al. | July 11, 1950 |